(12) United States Patent
Gullotti

(10) Patent No.: US 6,637,180 B2
(45) Date of Patent: Oct. 28, 2003

(54) HAND TOOL HAVING A FLEXIBLE HANDLE MEMBER

(76) Inventor: Michael Gullotti, 99 Elam Ave., Jamestown, NY (US) 14701

( * ) Notice: Subject to any disclaimer, the term of this patent is extended or adjusted under 35 U.S.C. 154(b) by 0 days.

(21) Appl. No.: 10/093,007

(22) Filed: Mar. 7, 2002

(65) Prior Publication Data

US 2002/0129595 A1 Sep. 19, 2002

Related U.S. Application Data

(63) Continuation-in-part of application No. 09/810,701, filed on Mar. 16, 2001.

(51) Int. Cl.$^7$ ................................................ A01D 7/00
(52) U.S. Cl. ..................................... 56/400.01; 16/430
(58) Field of Search ........................ 56/400.01, 400.16, 56/400.17, 400.18, 400.19, 400.2, DIG. 18; 16/110.1, 430, 110 R; D8/13, 300, 315, DIG. 7

(56) References Cited

U.S. PATENT DOCUMENTS

| | | |
|---|---|---|
| 1,095,966 A | 5/1914 | Hayden |
| 1,123,682 A | 1/1915 | Carroll |
| 1,187,176 A | 6/1916 | Reed |
| 1,244,789 A | 10/1917 | Stetson |
| 1,390,797 A * | 9/1921 | Lea ............................ 172/371 |
| 1,515,927 A | 11/1924 | Claire |
| 1,693,492 A | 11/1928 | Ostberg |
| 2,119,165 A | 5/1938 | Hornstein |
| 2,211,379 A | 8/1940 | Maclvor |
| 2,412,980 A | 12/1946 | Gould |
| 2,423,772 A | 7/1947 | Haase |
| 2,481,442 A | 9/1949 | Paul |
| 4,189,908 A | 2/1980 | Brock, Jr. |
| 4,704,758 A * | 11/1987 | Hoffman ..................... 15/144.4 |
| 4,754,516 A * | 7/1988 | Tremblay ................... 15/176.6 |
| 4,791,780 A | 12/1988 | Phillips |
| 4,985,961 A | 1/1991 | Kegley |
| 4,996,834 A | 3/1991 | Geist |
| 5,052,071 A * | 10/1991 | Halm ......................... 15/167.1 |
| 5,249,413 A | 10/1993 | McDonough, Jr. |
| 5,351,358 A * | 10/1994 | Larrimore ..................... 15/201 |
| 5,467,590 A * | 11/1995 | Mencarelli et al. ....... 56/400.17 |
| 5,533,768 A * | 7/1996 | Mitchell ..................... 294/54.5 |
| 5,555,711 A | 9/1996 | Costa |
| RE35,604 E | 9/1997 | McDonough, Jr. |
| 5,706,553 A * | 1/1998 | Riley et al. ................. 16/111.1 |
| 5,771,535 A * | 6/1998 | Blessing ....................... 16/430 |
| 5,878,563 A | 3/1999 | Dutcher |
| 5,920,944 A * | 7/1999 | Biggs et al. ................ 15/144.4 |
| 6,023,924 A | 2/2000 | Babineau |
| 6,152,939 A * | 11/2000 | Nguyen et al. ............. 606/161 |
| 6,170,112 B1 * | 1/2001 | Mayfield et al. ........... 15/159.1 |
| 6,367,112 B1 * | 4/2002 | Moskovich et al. ....... 15/167.1 |

OTHER PUBLICATIONS

Joshua Roth Catalog Limited, p. 7, available at www.joshua-roth.com/catalog/page7.html, dated 1999.*

* cited by examiner

*Primary Examiner*—Thomas B. Will
*Assistant Examiner*—Nathan Mammen
(74) *Attorney, Agent, or Firm*—Webb Ziesenheim Logsdon Orkin & Hanson, P.C.

(57) ABSTRACT

A flexible member is provided for use with a hand tool having a working implement and a handle. The flexible member includes an elongated member having a first end configured for attachment to the working implement and a second end configured for attachment to the handle. The elongated member defines a plurality of notches. The elongated member is made of a resiliently deformable material. The notches alternately face opposite directions along the length of the elongated member. The first end of the elongated member is configured for threaded or mechanical attachment to the working implement. The second end of the elongated member is configured for threaded or mechanical attachment to the handle.

8 Claims, 5 Drawing Sheets

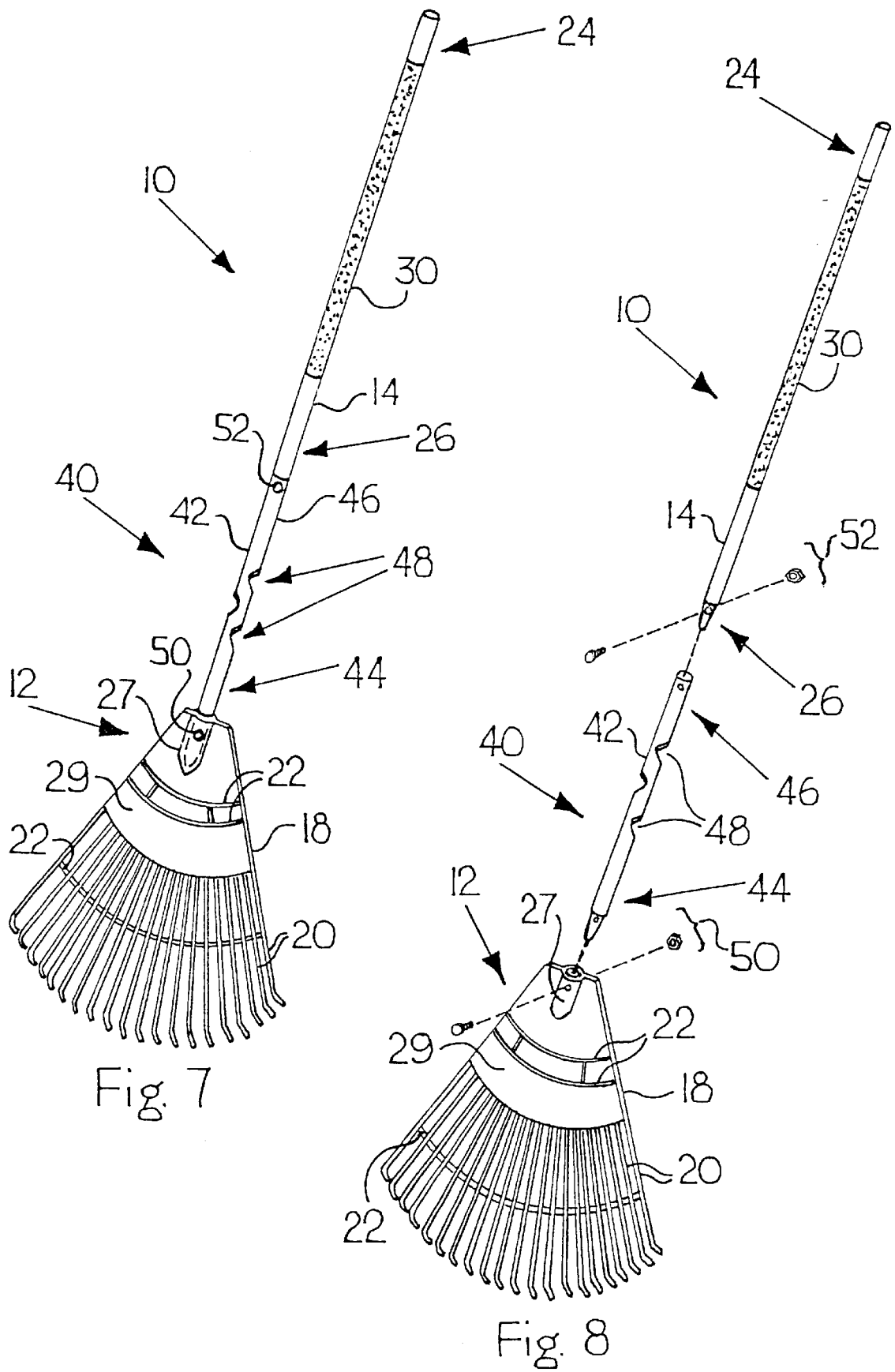

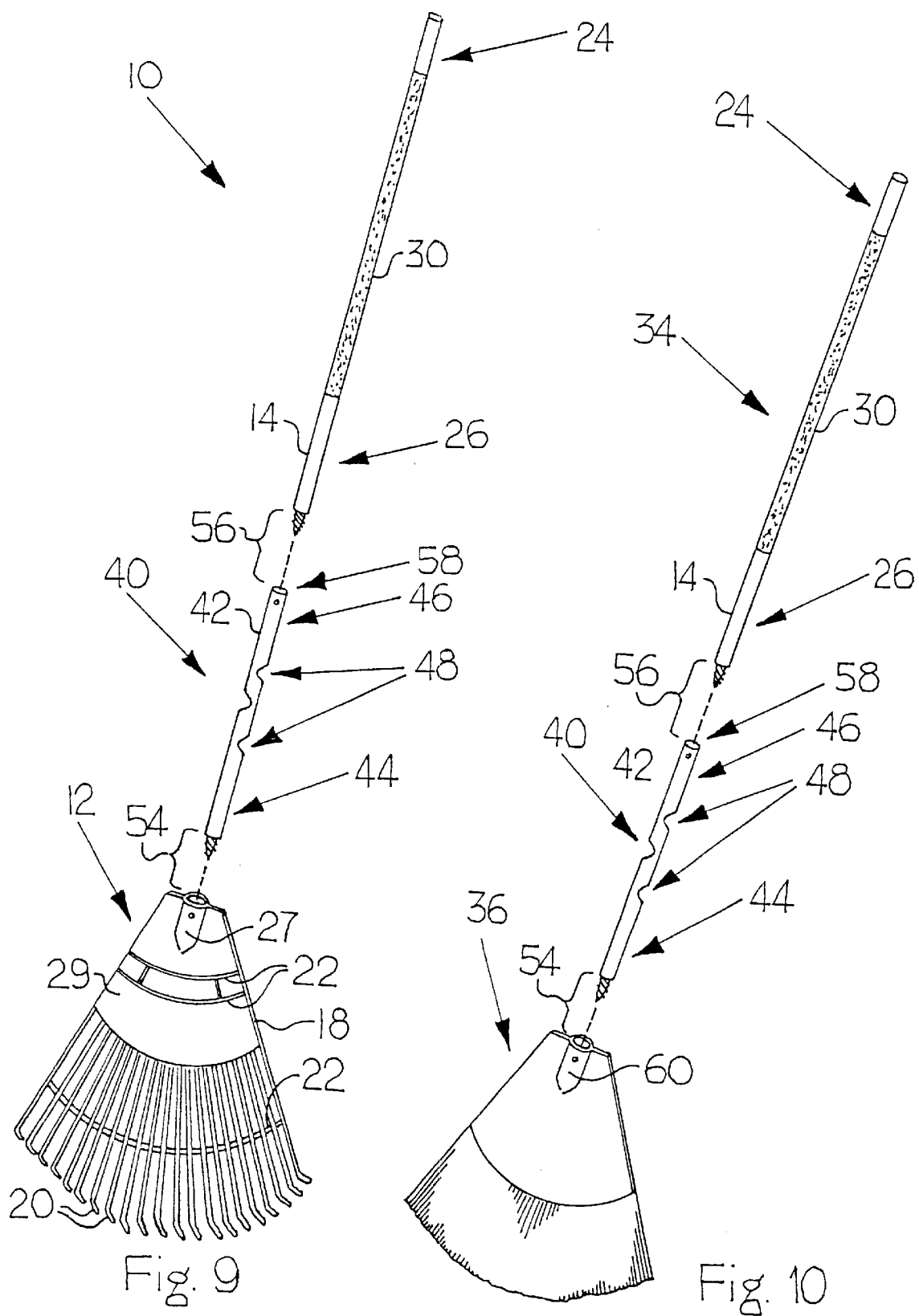

HAND TOOL HAVING A FLEXIBLE HANDLE MEMBER

CROSS-REFERENCE TO RELATED APPLICATION

This application is a continuation-in-part of U.S. application Ser. No. 09/810,701 filed Mar. 16, 2001, entitled "Ergonomic Rake Having A Flexible Handle."

BACKGROUND OF THE INVENTION

1. Field of the Invention

The present invention relates to hand tools and, more particularly, to an ergonomically designed hand tool that is easier to use and helps avoid injuries to the user.

2. Description of the Prior Art

Hand tools, such as lawn and yard rakes, are used for gathering grass, leaves, and other light yard debris. Standard yard rakes have an elongated, straight, and rigid handle attached to a rake head. The handle is typically made of strong but lightweight materials such as wood, aluminum, light gauge steel, or hard plastic. The rake head is typically made of lightweight and resilient material, such as bamboo, plastic, or thin metal strips. Yard rakes are used sporadically, with most use coming during the spring and fall seasons for obvious reasons. Often, persons not accustomed to doing manual labor use yard rakes. Standard yard rakes with straight handles and semi-resilient rake heads require a great deal of upper body strength to use. Over the years, attempts have been made to improve upon the standard rake design having a straight handle and semi-resilient rake head.

U.S. Pat. No. 2,423,772 to Haase teaches a rake having spring-biased tines in the rake head that may be deflected up to 90°. U.S. Pat. No. 2,119,165 to Hornstein teaches a rake with a spring-biased rake head. U.S. Pat. No. 4,189,908 to Brock, Jr. teaches a flexible rake having a rake head with a plurality of flexible tines that extend forward from a rigid, laterally-extending support panel. U.S. Pat. No. 4,791,780 to Phillips teaches a rake having an "S-shaped" angled handle allowing a user to rake forward with a forward sweeping motion. U.S. Pat. No. 4,985,961 to Kegley teaches a hand tool having a rake face and handle, with the handle including a pair of longitudinal gripping members having parallel axes and a connection member connecting the gripping members. U.S. Pat. No. 5,249,413 and Re. 35,604, both to McDonough, Jr., teach rakes having three pivotally mounted rake heads. The rake heads include springs that allow the rake heads to flex relative to the longitudinal axis of the rake handle, but also generally maintain a substantially parallel relationship between the three rake heads. U.S. Pat. No. 5,555,711 to Costa teaches a lawn rake having a spring pivoting rake head. The lawn rake disclosed by Costa incorporates a spring element that permits the rake head to flex relative to the longitudinal axis of the rake handle. U.S. Pat. No. 5,878,563 to Dutcher teaches a rake having a rake head inclined at a 45° angle with the rake handle. The rake disclosed by Dutcher further includes a pivotable support stand that is used to support the rake in an upright position when not in use. U.S. Pat. No. 6,023,924 to Babineau teaches a rake having a rake head and a handle formed with upper and lower offset handgrips.

A specific object of the present invention is to provide an improved lawn and yard rake that requires less physical strength to use and reduces the potential of injury to the user. It is a general object of the present invention to provide means for improving the handle of a hand tool that will allow the handle to flex and bend when the user applies force to the hand tool.

SUMMARY OF THE INVENTION

The present invention is an ergonomic rake that includes an elongated handle, a rake head, and a flexible member. The elongated handle has a first end and a second end. The rake head has a web portion and a plurality of rake tines extending from the web portion. The flexible member connects the handle and the rake head. The flexible member comprises an elongated member having a first end fixedly attached to the rake head and a second end fixedly attached to the second end of the handle. The elongated member defines a plurality of notches. The elongated member is made of a resiliently deformable material. The notches and the resiliently deformable material comprising the elongated member permit the flexible member connected to the handle and rake head to flex when downward pressure is applied to the handle by a user.

The notches may alternately face opposite directions along the length of the elongated member. The notches may be semicircular or V-shaped.

The flexible member may be between about 10% and 30% of the length of the handle.

The first end of the elongated member may be fixedly attached to the web portion of the rake head by mechanical fasteners. The second end of the elongated member may be fixedly attached to the second end of the handle with mechanical fasteners. Alternatively, the elongated member may be attached to the web portion of the rake head by a threaded connection, and the second end of the elongated member may be fixedly attached to the second end of the handle by a threaded connection.

The elongated member may be made of plastic.

The present invention is further directed to an ergonomic broom that includes an elongated handle, a broom head, and a flexible member. The elongated handle has a first end and a second end. The broom head has an attachment portion and a bristle portion. The flexible member connects the handle and the broom head. The flexible member comprises an elongated member having a first end fixedly attached to the attachment portion of the broom head, and a second end fixedly attached to the second end of the handle. The elongated member defines a plurality of notches. The elongated member is made of a resiliently deformable material. The notches and the resiliently deformable material comprising the elongated member permit the flexible member connected to the handle and broom head to flex when downward pressure is applied to the handle by a user.

Further, the present invention is directed to a flexible member for use with a hand tool having a working implement and a handle. The flexible member is comprised of an elongated member having a first end configured for attachment to the working implement and a second end configured for attachment to the handle. The elongated member defines a plurality of notches. The elongated member is made of a resiliently deformable material. The notches may be formed to alternately face opposite directions along the length of the elongated member.

The notches may be semicircular shaped or V-shaped.

The elongated member may be made of plastic.

The first end of the elongated member may be configured for threaded attachment to the working implement, and the second end of the elongated member may be configured for threaded attachment to the handle. Alternatively, the first end of the elongated member may be configured for attachment to the working implement with mechanical fasteners, and the second end of the elongated member may be configured for attachment to the handle with mechanical fasteners.

The elongated member may be solid in cross section or hollow in cross section. Additionally, the elongated member may be a solid rod made of plastic having between about three and five semicircular-shaped notches formed therein.

Further details and advantages of the present invention will become apparent from the detailed description read in conjunction with the drawings, wherein like reference numerals designate like parts throughout.

BRIEF DESCRIPTION OF THE DRAWINGS

FIG. 7 is a perspective view of a second embodiment of the ergonomic rake of the present invention;

FIG. 8 is an exploded perspective view of the ergonomic rake of FIG. 7 showing a flexible member in accordance with the present invention connecting the rake head and handle;

FIG. 9 is an exploded perspective view of the ergonomic rake of FIG. 7 showing threaded connections for connecting the flexible member to the rake head and handle; and FIG. 10 is an exploded perspective view of a second embodiment of the ergonomic broom of the present invention.

DETAILED DESCRIPTION OF THE PREFERRED EMBODIMENTS

Referring to FIGS. 1–4, an ergonomic rake 10 made in accordance with the present invention is shown. The rake 10 includes a rake head 12 and an elongated handle 14. The rake head 12 is secured to the handle 14 by a mechanical fastener 16, such as a pin lock, bolt and nut combination, rivet, or by any other equivalent means known in the art. The mechanical fastener 16 may also be replaced by a threaded connection between the rake head 12 and the end of the handle 14, as discussed hereinafter. The mechanical fastener 16 is preferably removable so that in the event either the rake head 12 or handle 14 break the broken part may be replaced. The present invention also envisions that the rake head 12 and handle 14 may be integrally formed, with the rake head 12 and handle 14 formed as a one-piece unit.

Figure 4:
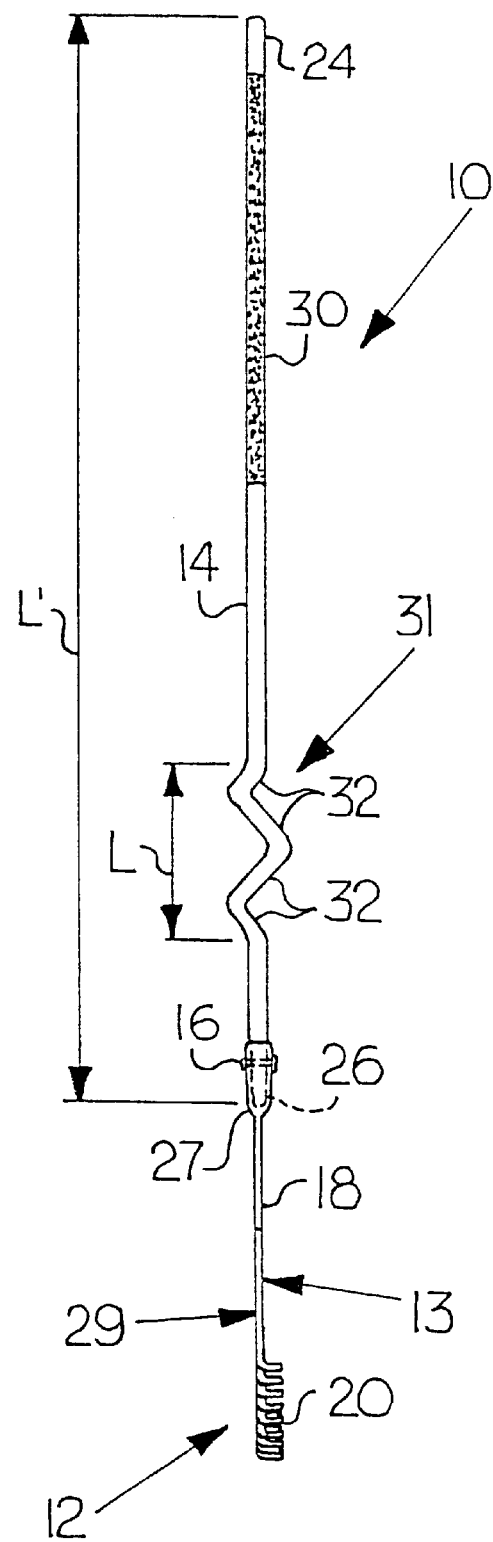
FIG. 4 is a side elevational view of the ergonomic rake.

The rake head 12, as is customary, is generally triangular-shaped. The rake head 12 includes a triangular-shaped web portion 18. A plurality of rake tines 20 extends from the web portion 18. The web portion 18 and tines 20 may be integrally formed. Alternatively, the rake tines 20 may be individually affixed to the web portion 18 by methods customary in the art. The rake tines 20 are curved at one end in a conventional manner. Thus, the rake head 12 has a rear or ground engaging side or face 13 facing the same direction as the curved ends of the tines 20, as shown in FIG. 4.

The rake head 12 may have reinforcing strips 22 attached to the web portion 18 and tines 20. As shown, for example, in FIGS. 1 and 3, the reinforcing strips 22 may extend transversely across the rake head 12, as well as longitudinally along the rake head 12. The reinforcing strips 22 may be provided as ribs formed integrally with the web portion 18. The reinforcing strips 22 may be metal or plastic. The rake head 12 is preferably fabricated from molded plastic material, which makes formation of the aforementioned ribs a simple process. The rake head 12 may also be formed of other materials including lightweight metal, such as aluminum or light gauge steel, lightweight wood, such as bamboo, and fiberglass. The rake head 12 may have any suitable dimensions. A suitable dimension for most domestic lawn and yard uses is about twenty-four inches across the widest part of the rake head 12.

The handle 14 includes a first end 24 and a second end 26. The second end 26 is secured to the rake head 12 by the mechanical fastener 16 as discussed previously. As shown in FIG. 4, the second end 26 of the handle 14 is inserted into a socket or sleeve 27 formed at the apex of the web portion 18. The mechanical fastener 16 extends through an aperture 28 extending through the sidewall of the socket 27 and the second end 26 of the handle 14 to secure the connection between the handle 14 and the rake head 12. The aperture 28 for the mechanical fastener 16 is preferably oriented substantially perpendicular to a front or "non-engaging" side or face 29 of the rake head 12. The mechanical fastener 16 may be replaced by a threaded connection between the second end 26 of the handle 14 and the socket 27. Such a threaded connection would include internal threads in the socket 27 and mating external threads on the second end 26 of the handle 14.

The elongated handle 14 may have any overall length. The handle 14 is preferably provided as an elongated hollow or solid tube. A suitable length for the handle 14 that is comfortable for most people is between about four to six feet. The handle 14 and, preferably, the rake head 12 are made of a flexible plastic material, such as molded plastic, metal, or wood. The handle 14 and rake head 12, while being to some degree resiliently flexible, are rigid enough to withstand typical domestic raking applications, such as leaf raking or lawn raking, without permanently deforming or breaking. The material comprising the handle 14 and rake head 12 is selected accordingly.

A handgrip 30 is preferably provided adjacent the first end 24 of the handle 14. The handgrip 30 may be formed into the handle 14 which, as stated previously, is preferably made of molded plastic material. Thus, the formation of an integral handgrip 30 may be added to the molding process for the handle 14. The handgrip 30 may also be a rubber sleeve or grip that is placed over the first end 24 of the handle 14. The handgrip 30 may have any suitable dimension. A suitable dimension for most people is between about twelve and eighteen inches long.

Figures 1, 2:
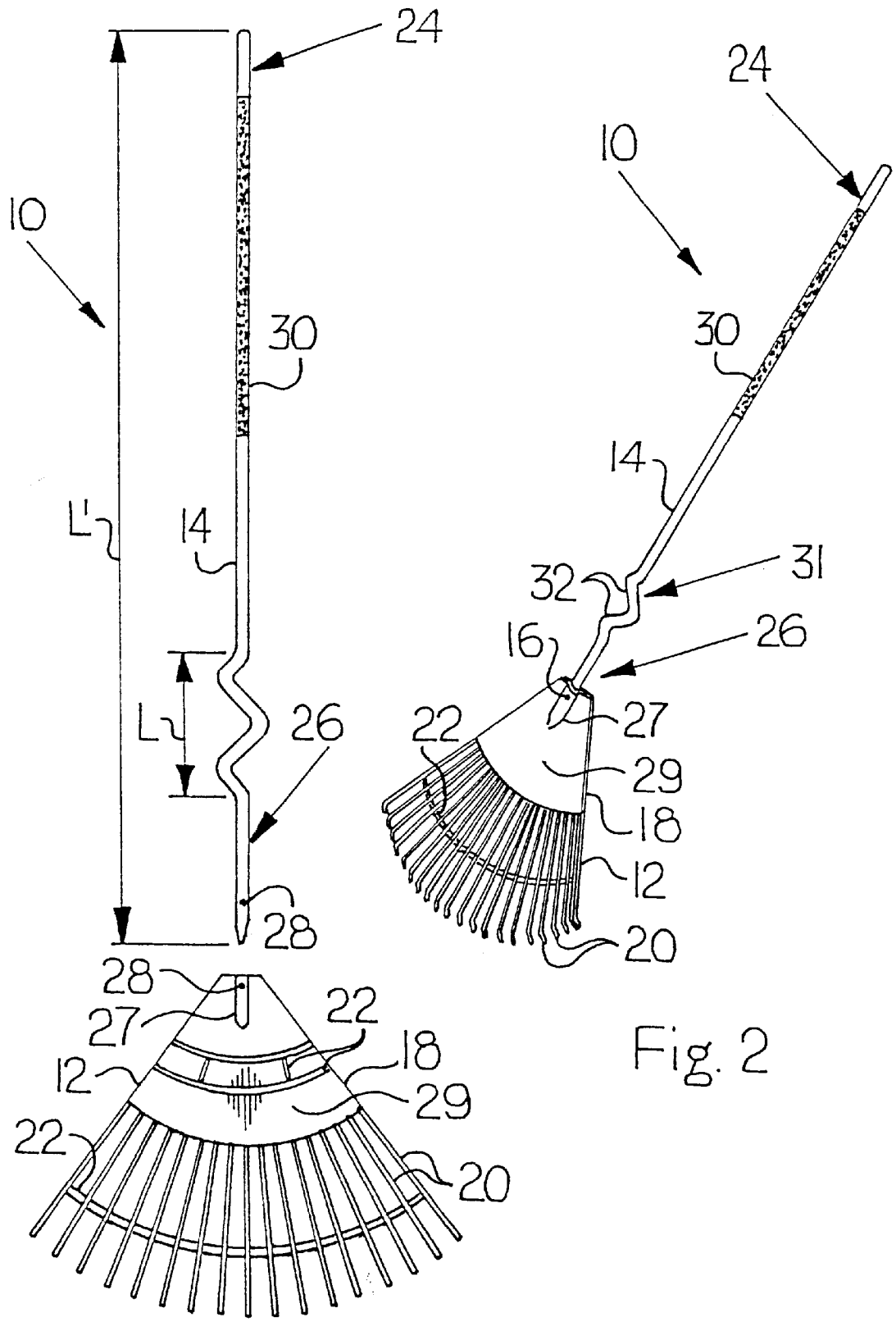
FIG. 1 is a front elevational view showing a handle and rake head of the ergonomic rake of the present invention.
FIG. 2 is a perspective view of the assembled ergonomic rake of the present invention.
Figure 3:
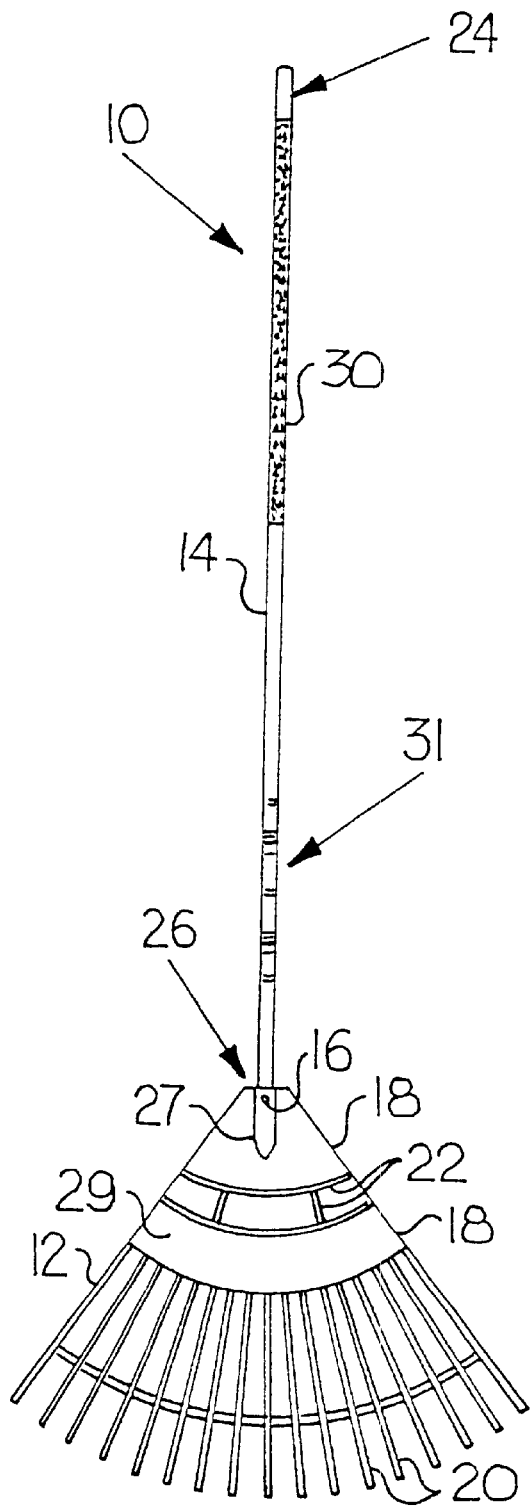
FIG. 3 is a front elevational view of the ergonomic rake.

The handle 14 further includes a flexible portion 31 defined by a plurality of bends 32 formed adjacent the second end 26 of the handle 14. The bends 32 are preferably aligned with a plane that is substantially perpendicular to a plane defined by the front side 29 of the rake head 12, as shown in FIG. 4. Alternatively, the bends 32 may be oriented in a plane substantially coincident with the plane defined by the front side 29 of the rake head 12, as shown in FIG. 1. The flexible portion 31 may have any number of bends 32, but in a preferred embodiment of the present invention four to six bends 32 are included in the flexible portion 31. The bends 32 may be formed at angles of about 30° and 60° between each other. The flexible portion 31 has an overall distance L of about eight inches in a preferred embodiment of the handle 14. The overall distance L of the flexible portion 31 preferably comprises between about 10% and 30% of the overall distance L' of the handle 14, as shown in FIG. 4. Thus, with a handle 14 having an overall length of four feet (48 inches), the overall distance of the flexible portion 31 may be between about 4.5 inches and 14.5 inches. The flexible portion 31 is integrally formed with the handle 14, but may also be made of a different material than the remainder of the handle 14. For example, the handle 14 may be made of wood or metal with the flexible portion 31 made of plastic and secured at one end thereof to the handle 14 and the other end thereof to the rake head 12. Such connectives may be secured by mechanical fasteners, or by other means customary in the art.

Figure 5:
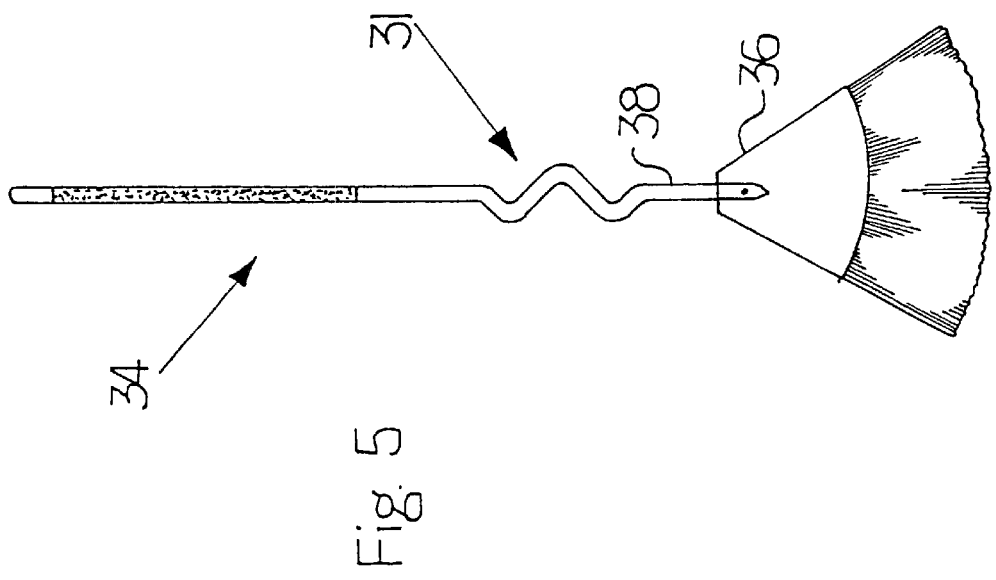
FIG. 5 is a perspective view of an ergonomic broom according to another embodiment of the present invention.

Referring to FIG. 5, a second embodiment of the present invention is shown and is directed to an ergonomic broom 34. The present invention further envisions that a broom head 36 may replace the rake head 12. The broom head 36 is connected to a handle 38 in a similar manner to the rake head 12 and handle 14 discussed previously. The handle 38 used with the broom head 36 in the broom 34 is identical to the handle 14 discussed previously. The broom head 36 may be a conventional straw broom head or contain plastic bristles as are well known in the art. The dimensions given previously for the handle 14 may also be applied to the handle 38.

Figure 6:
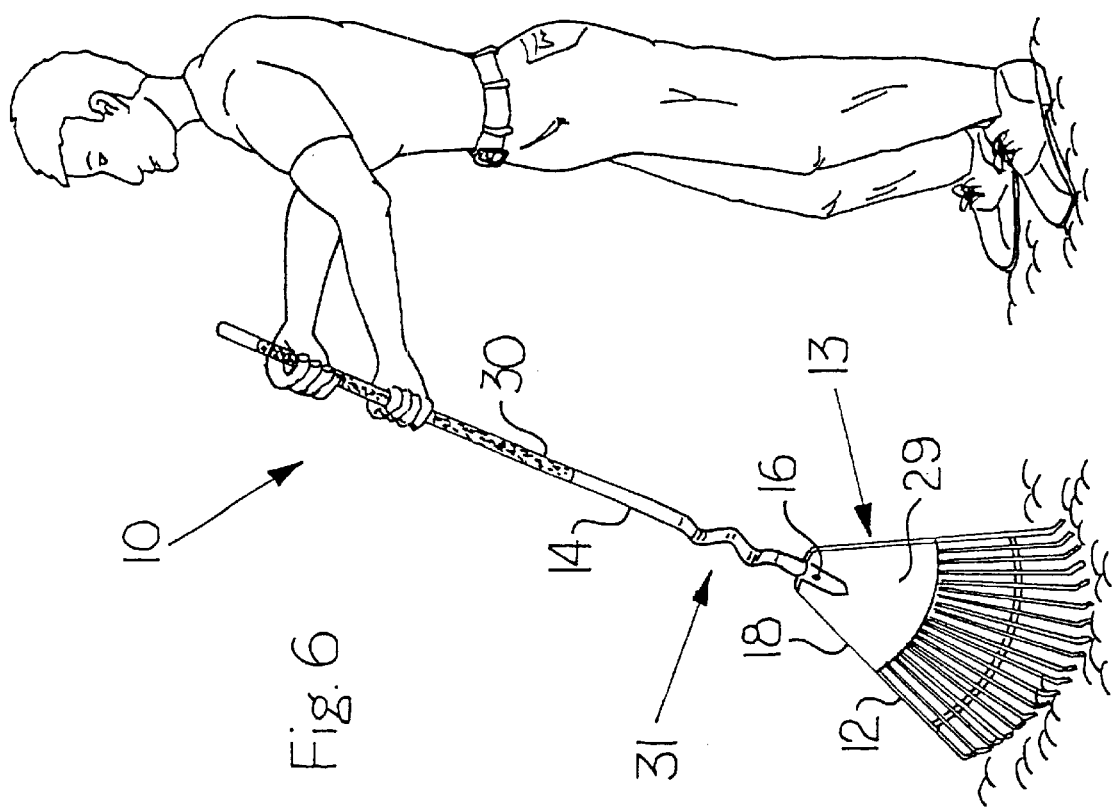
FIG. 6 is a perspective view showing a person using the ergonomic rake of the present invention.

Referring to FIG. 6, in operation, the user will place the rake head 12 in contact with the ground, with the tines 20 touching the ground. The user will make normal raking movements with the rake 10 gathering any leaves, grass, or other debris with the rake head 12. While making normal raking movements, the user maintains light downward pressure on the rake head 12. The flexible portion 31 allows the handle 14 to bend and flex as the rake head 12 moves over the ground. The bending and flexing provided by the flexible portion 31 causes the rake head 12 to tightly grab the ground and securely contain the raked material under the rake head 12. Additionally, the bending and flexing provided by the flexible portion 31 enables the user to exert less force with his or her back muscles, shoulder, and arm muscles over prior art rakes having traditional rigid handles 14. The present invention further envisions that the handle 14 may be used with any type of hand tool where it is necessary or desirable for the handle of the implement to bend and flex under work conditions. Thus, the handle 14 is uniquely suited for use as a replacement handle for most types of lawn and garden hand tools.

Additional embodiments of the ergonomic rake 10 and ergonomic broom 34 of the present invention are shown in FIGS. 7–10. FIGS. 7–9 show the ergonomic rake 10 according to a second embodiment of the present invention. FIG. 10 shows a second embodiment of the ergonomic broom 34 of the present invention. Referring to FIGS. 7–9, the rake 10 is substantially similar to the rake 10 discussed previously in connection with FIG. 14, but includes a flexible member 40 for connecting the elongated handle 14 and the rake head 12. The first end 24 of the handle 14 is configured in a similar manner to the rake 10 of FIGS. 1–4. The flexible member 40 is comprised of an elongated member 42 having a first end 44 and a second end 46. The first end 44 is configured for attachment to the rake head 12. The second end 46 is configured for attachment to the second end 26 of the handle 14. The flexible member 40 is substantially similar to the flexible portion 31 discussed previously, but is provided separate from the handle 14 and rake head 12, and may be retrofitted onto existing rakes or be provided with the handle 14 and rake head 12 as shown in FIGS. 7–9. The elongated member 42 defines a plurality of notches 48. The notches 48 preferably alternately face opposite directions along the length of the elongated member 42. The notches 48 may be semicircular shaped or V-shaped. V-shaped notches 48 are shown in FIG. 10, discussed hereinafter. As with the flexible portion 31, the flexible member 40 preferably comprises between about 10% and 30% of the overall length of the handle 14. The flexible member 40 may be made of the same material that comprises the handle 14 and rake head 12. For example, the rake head 12 may be made of plastic, the handle 14 may be made of wood, such as bamboo, and the flexible member 40 may be made of a flexible but resilient material, such as plastic or rubber. The important characteristic of the flexible member 40 is that it is made of a resiliently deformable material that flexes when downward pressure is applied on the handle 14 and rake head 12 by the user of the rake 10. The notches 48 provide locations at which the elongated member 42 may flex or bend, further adding to the flexibility of the flexible member 40.

FIGS. 8 and 9 show different methods for attaching the flexible member 40 to the handle 14 and the rake head 12. In FIG. 8, the first end 44 of the elongated member 42 is fixedly attached to the web portion 18 of the rake head 12 by mechanic fasteners, such as a nut and bolt combination 50. Similarly, the second end 46 of the elongated member 42 is fixedly attached to the second end 26 of the handle 14 with a second set of mechanical fasteners, such as a second nut and bolt combination 52. FIG. 9 shows threaded connections 54 between the first end 44 of the elongated member 42 and the web portion 18, and a second threaded connection 56 between the second end 46 of the elongated member 42 and the second end 26 of the handle 14. In each case, the first end 44 of the elongated member 42 is tapered or pointed to cooperate with the socket 27 formed in the web portion 18 of the rake head 12. The second end 46 of the elongated member 42 defines a cavity 58 for receiving the second end 26 of the handle 14. The cavity 58 may be internally threaded to receive the external threads on the second end 26 of the handle 14, as shown in FIG. 9. The elongated member 42 is preferably solid in cross section, except for the cavity 58 located at the second end 46 of the elongated member 42, which is adapted to receive the second end 26 of the handle 14. However, the elongated member 42 may also be hollow in cross section. Typically, the elongated member 42 is provided as a solid rod made of a resiliently deformable plastic material and includes between about three and five semicircular-shaped notches 58.

As stated, the present invention envisions that the flexible member 40 may be used on existing rake heads as a retrofit item. For example, when an existing rake handle is broken, the flexible member 40 may be provided as an extension piece that may be connected to the rake head and the remaining portion of the handle. Further, the flexible member 40 may be provided as an extension piece for an existing rake to enhance the flexibility of the rake. The present invention further envisions that the flexible member 40 may be used with other hand tools where flexibility of the handle may be important, such as any type of broom or brush.

Referring to FIG. 10, a second embodiment of the ergonomic broom 34 is shown. The embodiment of the ergonomic broom 34 shown in FIG. 10 is substantially similar to the ergonomic broom 34 shown in FIG. 5, but further includes the flexible member 40 discussed hereinabove. The flexible member 40 shown in FIG. 10 illustrates the V-shaped notches 58 provided in the elongated member 42. Other shapes may be provided for the notches 58. The notches 58 provide locations at which the elongated member 42 may bend or flex when downward pressure is provided on the handle 14 and broom head 36 by the user of the broom 34. The remaining aspects of the broom 34 shown in FIG. 10 are substantially similar to the rake 10 discussed hereinabove in connection with FIGS. 7–9. The broom 34 includes an attachment portion 60 to which the first end 44 of the elongated member 42 may be attached. The first end 44 of the elongated member 42 may be attached to the attachment portion 60 according to the methods shown in FIGS. 8 and 9 discussed previously.

The rake 10 of the present invention provides an improved lawn and yard rake that requires less physical strength to use. In addition, the rake 10 of the present invention provides a lawn and yard rake that has an improved, flexible handle 14, which may include a flexible member 40 as shown in FIGS. 7–10, that makes the rake 10 operate more efficiently and with less physical force required from the user.

While the presently preferred embodiments of the invention were described hereinabove, obvious modifications and alterations of the invention may be made without departing from the spirit and scope of the invention. The invention is defined hereinafter in the appended claims and equivalents thereto.

I claim:

1. An ergonomic yard rake, comprising:
   an elongated handle having a first end and a second end;
   a rake head having a web portion and a plurality of rake tines extending from the web portion; and
   a flexible member connecting the handle and rake head, with the flexible member comprising an elongated member having a first end fixedly attached to the rake head and a second end fixedly attached to the second end of the handle, with the elongated member defining a plurality of notches, and with the elongated member made of a resiliently deformable material,
   wherein the notches and the resiliently deformable material comprising the elongated member permit the flexible member connecting the handle and rake head to flex when downward pressure is applied to the handle by a user.

2. The ergonomic yard rake of claim 1, wherein the notches alternately face opposite directions along the length of the elongated member.

3. The ergonomic yard rake of claim 2, wherein the notches are semicircular shaped.

4. The ergonomic yard rake of claim 2, wherein the notches are V-shaped.

5. The ergonomic yard rake of claim 1, wherein the flexible member is between about 10% and 30% of the length of the handle.

6. The ergonomic yard rake of claim 1, wherein the first end of the elongated member is fixedly attached to the web portion of the rake head by mechanical fasteners, and wherein the second end of the elongated member is fixedly attached to the second end of the handle with mechanical fasteners.

7. The ergonomic yard rake of claim 1, wherein the first end of the elongated member is attached to the web portion of the rake head by a threaded connection, and wherein the second end of the elongated member is fixedly attached to the second end of the handle by a threaded connection.

8. The ergonomic yard rake of claim 1, wherein the elongated member is made of plastic.

* * * * *